(12) United States Patent
Smith

(10) Patent No.: US 6,886,709 B2
(45) Date of Patent: May 3, 2005

(54) CLOSURE APPARATUS AND METHOD OF CLOSING AN OPENING

(75) Inventor: Brian Smith, Nottinghamshire (GB)

(73) Assignee: General Signal UK Limited, Stockport (GB)

( * ) Notice: Subject to any disclaimer, the term of this patent is extended or adjusted under 35 U.S.C. 154(b) by 37 days.

(21) Appl. No.: 10/368,639

(22) Filed: Feb. 20, 2003

(65) Prior Publication Data
US 2004/0164078 A1 Aug. 26, 2004

(51) Int. Cl.$^7$ ................................................. B65D 45/00
(52) U.S. Cl. .......................... 220/316; 220/833; 99/324
(58) Field of Search ................................ 220/315–321, 220/323, 224, 831–834, 263, 696, 755, 751, 762–766, 231.1, 231.2; 99/324, 337; 294/16, 27.1, 28, 30, 34, 31.1; 268/23.1, 231.2

(56) References Cited

U.S. PATENT DOCUMENTS

| 1,925,492 A | * | 9/1933 | Mohler ........................ 62/54.2 |
| 2,869,752 A | | 1/1959 | Hall ............................. 220/40 |
| 3,653,533 A | * | 4/1972 | Mortensen ................... 220/298 |
| 3,990,605 A | | 11/1976 | Hanke et al. ................ 220/316 |
| 5,768,976 A | * | 6/1998 | Suk .............................. 99/337 |

* cited by examiner

Primary Examiner—Lien Ngo
(74) Attorney, Agent, or Firm—Baker & Hostetler LLP

(57) ABSTRACT

A closure apparatus comprises a collar 2 having a collar periphery and having a collar inner surface defining an opening 3, a closure 10, having a closure periphery, said closure 10 being for closing said opening 3, a bearing structure 7 being located around said collar periphery or said closure periphery, a locking ring 18 being mounted for rotation with respect to said closure 10 and said opening 3 on said bearing structure 7, so that said locking ring 18 is rotatable between a locking position for locking said closure 10 to said opening 3 and an unlocked position for permitting said closure 10 to be moved away from said opening 3.

15 Claims, 7 Drawing Sheets

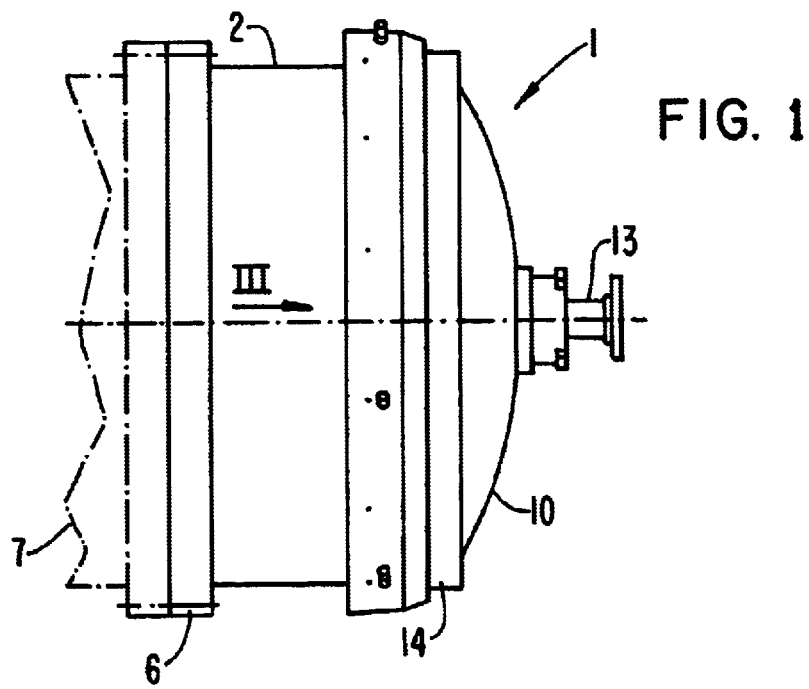
FIG. 1
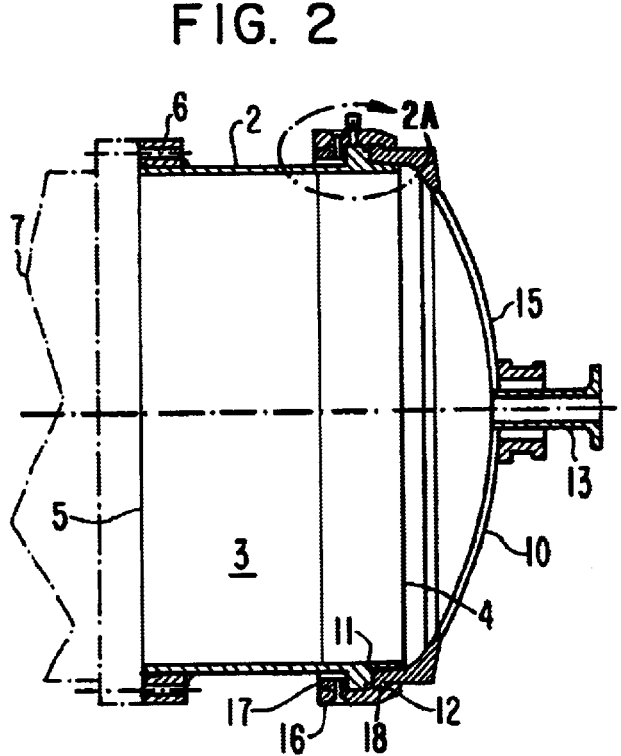
FIG. 2
FIG. 2A

CLOSURE APPARATUS AND METHOD OF CLOSING AN OPENING

FIELD OF THE INVENTION

The present invention relates generally to closure apparatus for closing an opening and a method for closing an opening. More particularly, the present invention relates to a closure apparatus of the type having a collar, with an opening therethrough, a closure for closing the opening and a locking ring for locking the closure to the collar in a closed position.

BACKGROUND OF THE INVENTION

In fluid or gas handling systems in industry, particularly pressurised systems, it is known to provide a so-called closure assembly to provide quick and secure access into some part of the interior of the fluid or gas handling system. For example, in the gas, chemical and waste treatment industries, it is common for there to be various pipelines and vessels that generally operate in a pressurised environment. Such vessels need to be openable for loading/unloading and also for servicing operations such as cleaning, inspection, changing filters or other replacable elements.

Some applications of closure apparatus include those in the petrochemical, pharmaceutical, and chemical process industries, such as blow downs, manways, filters, strainers, coalescers, waste disposal vessels and autoclaves. Typically, closures may operate with working pressures up to $5 \times 10^6$ Pa and temperatures from minus 50° F. to 400° F.

Many types of locking apparatus can be provided for locking a closure in the closed position. For example, there may be a flange around the opening. A covering or closing element which forms a cap may be provided: It may be engageable with the opening by a screw thread or other suitable apparatus.

The opening, and the corresponding closure, may be any suitable size. For example, closures may be as small as 100 mm. However, in many applications, very large closures are required, for example for large pressure vessels. For example, it may be necessary to have a closure capable of closing an opening of diameter greater than 1000 mm and may be as much as 1500 mm. Particularly where the operating pressures are particularly high, the closure may accordingly be very large and heavy.

Problems may be encountered when the closure is very large, for example when it has a diameter of 1000 mm or more. In particular, the closure may be very heavy and difficult to manipulate or rotate in the unlocking operation. Further, where the closure is of very large diameter, and locking is provided by locking lugs, in order to obtain a strong locking force around the periphery of the closure, a large number of lugs may be required which are difficult to operate together. This may also make the locking system very expensive to manufacture.

It is an object of the present invention to provide a closure apparatus which overcomes the problems of the prior art. It is a further object of the present invention to provide a method of closing an opening using the closure apparatus, which overcomes the problems of the prior art.

SUMMARY OF THE INVENTION

It is a further object of the present invention to provide a closure apparatus which can be used with large closures, for example closures having a diameter of 1000 mm or more. It is a further object of the present invention to provide a method of closing an opening using a closure apparatus in which the closure is of large diameter, for example 1000 mm or more.

The present inventors have realised that an annular locking ring may be provided which is mounted on a bearing structure which is located around the periphery of an opening or around the periphery of a closure for the opening, Accordingly, the present invention provides a closure apparatus comprising:

a collar, having a collar periphery and collar inner surface defining an opening, a closure for closing said opening, having a closure periphery, a bearing structure being located around said collar periphery or said closure periphery, a locking ring being mounted for rotation on said bearing structure so that said locking ring is rotatable from a first, locked position for locking said closure to said opening, and a second, unlocked position, in which said opening can be moved with respect to said closure.

The present invention further provides a method of closing an opening formed in a collar, comprising moving a closure from an open position to a closed position, the closure closing said opening is said closed position, rotating a locking ring from an unlocked position to a locked position, said collar having a collar periphery and said closure having a closure periphery, a bearing structure being located around said collar periphery or said closure periphery, said locking ring being mounted for rotation on said bearing structure with respect to said closure and said opening.

The collar and the closure may be of any suitable design, as is well known in the art. They may be moved together for closing the opening in any suitable way, for example by rotation of the closure into a closed position.

The bearing structure may comprise at least one bearing surface located around the periphery of said opening or said closure. It may comprise a plurality of bearing surfaces located around the periphery of said opening or said closure. The bearing surfaces may be separate from one another or they may abut one another.

Preferably, the bearing structure defines a bearing for rotatably mounting the locking ring about an axis which is substantially coaxial with the axis of the opening.

Preferably, the bearing structure comprises at least one annular bearing surface whole is radius is at least equal to the radius of said opening, and preferably greater than the radius of said opening.

The bearing stricture may be formed on either the opening or the closure. Preferably, the bearing structure is formed on said opening, so that said locking ring is mounted with respect to said opening.

By providing a separate locking ring which can be rotated between a locked position and an unlocked position, there is no need to rotate the closure itself. This can simplify the construction of the apparatus. It also allows the closure to be of a design which does not itself require rotation.

By providing a bearing structure which is located around the periphery of the opening or the closure, a locking ring can be provided which extends around the periphery of the opening or closure and which can be therefore used to operate locking means located around the periphery of the opening or closure, giving the uniform and even support for the closure using a simple design. Easy operation and maintenance of the closure apparatus can be obtained.

A particularly preferred locking mechanism comprises engagement formations formed on said locking ring, said closure and said collar. Preferably, said collar comprises a collar outer surface, at least one first engagement formation being formed on said collar outer surface, said closure having a closure outer surface, at least one second engagement formation being formed on said closure outer surface, said locking ring having a locking ring inner surface and at least one third engagement formation and at least one fourth engagement formation formed on said locking ring inner surface, said locking ring being rotatably mounted with respect to said collar and said closure, between a locked position and an unlocked position, said closure closing said opening in a closed position and being spaced away from said opening in an open position, said locking ring being configured so that said third engagement formation engages one of said first and second engagement formations, and so that, in said locked position, said fourth engagement formation is engaged with the other of said first and second engagement portions, to hold said closure in said closed position, and in said unlocked position, said fourth engagement formation is spaced apart from said other of said first and second engagement portions to permit said closure to be moved into said open position.

According to this embodiment of the invention, the locking ring must be movable between a locked position in which its fourth engagement formation engages the first engagement formation which is formed on the collar or the second engagement formation, which is formed on the closure. It must also have a second, unlocked position, in which this fourth engagement formation is spaced away from and disengaged from whichever of the first and second engagement formation it engaged in the locked position. The third engagement formation, on the other hand, is preferably permanently engaged with the first engagement formation on the collar or the second engagement formation on the closure. It is possible for the third engagement formation to be disengagable with this first or second engagement formation in the unlocked position, but this is not necessary, as the whole locking/unlocking operation can be carried out by the engagement/disengagement of the fourth engagement formation with the respective first or second engagement formation. Accordingly, it is preferred that the locking ring is permanently, rotatably mounted on one of the closure or the collar. Preferably, it is permanently rotatably mounted on the collar so that the third engagement formation of the locking ring is permanently engaged with the first engagement formation of the collar. In this way, the collar, which is typically the fixed part, carries the weight of locking ring.

Preferably, said bearing structure is located adjacent to the first engagement formation formed on said collar outer surface or adjacent said second engagement formation formed on said closure outer surface. In this way, the structure of the closure apparatus can be made small and strong.

The locking ring preferably comprises a corresponding bearing structure for engaging the bearing structure formed on the opening or collar. Preferably, the locking ring bearing structure comprises a plurality of separate locking ring bearing surfaces. Preferably, the bearing locking ring surfaces lie around the periphery of a notional circle.

Preferably, at least one of said third engagement formation and said one of said first and second engagement formations engaged by said third engagement formation comprises a substantially continuous annular surface against which the other of said third engagement formation or said one of said first and second engagement formations is slidably mounted.

Preferably, the locking means is rotatably mounted on said collar and said fourth engagement formation is engageable with said second formation of said closure in said locked position, said fourth engagement formation being spaced apart from said second engagement formation in the said unlocked position to permit said closure to be moved into said open position.

Each of the fourth engagement formation and whichever of the first or second engagement formations it engages may comprise a single engagement part. Sometimes, where the pressure load on the closure apparatus is not high, this will suffice. However, preferably, the fourth engagement formation comprises a plurality of fourth engagement parts and the corresponding first or second engagement formations comprise a plurality of first or second engagement parts. Preferably, the engagement parts are spaced around the periphery of the collar/closure to provide evenly distributed locking support in the locked position. Preferably the fourth engagement formation comprises at least four engagement parts, and more preferably at least six engagement parts. The engagement parts may be spaced apart from one another by clear sections in which no engagement part is formed. In the unlocked position, the engagement parts of the locking ring are aligned with clear sections between the engagement parts of the first or second engagement formations. Similarly, the engagement parts of the first or second engagement formation are aligned with clear sections on the locking ring so that, in order to move from the closed position to the open position, the respective engagement parts may be moved through the clear sections with which they are aligned. Suitably, the engagement parts on the collar or closure comprise portions which extend to a first radial distance and the clear sections comprise portions which extend to a second radial distance which is smaller than the first radial distance. Correspondingly, the engagement parts which project inwardly from the locking ring preferably comprise parts which extend to a first radial distance and the clear portions comprise parts which extend to a second radial distance which is the greater than the first radial distance.

In a preferred embodiment, said fourth engagement formation comprises at least four engagement parts projecting from said locking ring inner surface, said engagement parts being spaced apart from one another by clear sections, said other of said first and second engagement formations comprising the same number of engagement parts as are formed on said locking ring, spaced apart by clear sections, said engagement parts and clear sections being configured so that, in said unlocked position, said engagement parts can pass through said clear sections.

Preferably, a drive is provided for driving the locking ring to rotate between the locked position and the unlocked position. Any suitable drive may be used. It may be a manual drive, for example, a lever, cog wheel or ratchet arrangement, or it may be a powered drive, for example, electric, hydraulic, pneumatic or any other suitable drive. In a particularly simple arrangement, the locking ring comprises at least one drive formation, the drive comprising at least one drive part engageable with the drive formation, the drive part being reciprocable between a first drive position corresponding to the locked position and a second drive position corresponding to said unlocked position. In this embodiment, the drive can simply comprise a hydraulic cylinder which is reciprocable between these two positions.

In a preferred embodiment, the locking ring is rotatably mounted on the bearing structure on one of said collar or closure, at least one of the locking ring and said one of said collar and closure comprising a substantially continuous annular bearing surface and the other of said locking ring and said one of said closure or collar comprising bearing pieces slidably contacting said annular surface. By providing a plurality of individual bearing pieces it is found that adjustment of the position of the bearing pieces during manufacture is made easier than, for example, machining a pair of large, mating bearing surfaces. It is particularly preferred that an adjustment is provided for each bearing piece to allow it to be adjusted in a radial direction towards or away from said annular surface. The adjustment may also be adjustable in a circumferential direction.

Safety locking means may be provided for preventing unintentional rotation of the locking ring between the locked position and unlocked position. Suitably, the safety locking means has a latched position and an unlatched position, the safety locking means preventing said locking ring from rotating from said locked position to said unlocked position in said latched position, and permitting said locking ring to be rotated from said locked position to said unlocked position in said unlatched position. Suitably, the safety locking means comprises at least one first latching formation on at least one of the closure and the collar and at least one second latching formation on the locking ring and at least one latching member for engaging the first latching formation and the second latching formation in the latching position to prevent relative movement thereof. The first and second latching formations may each comprise a simple projection or pair of projections, the latching member engaging both of them in the latched position and engaging just one of them or neither of them in the unlatched position.

Suitably, the collar has an axial direction, the closure being movable between the closed position and the open position along the axial direction. A closure drive is suitably provided for driving the closure along the axis between the closed and open positions. The closure drive may comprise any suitable drive, for example, a manually operated drive, or an electrical, hydraulic, or pneumatic drive. Suitably, the closure is mounted on a closure carriage which comprises a closure track for moving the closure in the axial direction and a closure hinge which allows the closure to move from the open position to a distant position which is angularly displaced from the open position. In this way, the closure can be disengaged from the opening by moving it to the open position and then swung out of the way to allow clear access to the opening, in the distant position.

The closure itself may be relatively heavy, having in a weight in excess of 20 kilograms more preferably in excess of 40 kilograms.

In a particularly preferred embodiment, the closure is mounted on a closure carriage, the closure carriage comprising a closure grip for releasably engaging the closure. This is particularly advantageous if it is desired that the closure of the carriage should be disconnectable from the closure at some stage in the operation. This may be required, for example, if the closure becomes very hot during operation or if the closure together with the collar is moved during operation, for example as is the case in a waste incinerating vessel which is rotated about its axis during operation.

Preferably, the closure grip comprises at least two closure grip parts and the closure comprises at least one closure grip mount, a closure grip part drive being provided for driving said first and second closure grip parts to engage said closure grip mount.

In a preferred embodiment, the closure grip has a closure grip control, a first grip part drive and a second grip part drive, the first grip part being located vertically above the second grip part, the closure grip control controlling the first grip drive and the second grip drive so that said second grip part applies a greater gripping load to said closure grip mount than said first grip part. In this way, a greater pressure is applied to the grip mount from below, so that the weight of the closure is taken up by the second grip part, so that closure is properly balanced ready for movement from the closed to the open position.

This feature is believed to be inventive in its own right and accordingly, in a second aspect, the present invention provides a closure apparatus comprising a collar, having an opening defined therethrough, a closure, said closure closing said opening in a closed position and being spaced away from said opening in an open position, said closure comprising a closure grip mount, a closure carriage for mounting said closure and for moving said closure between said closed position and said open position said closure mount comprising first and second closure grip parts, said closure carriage comprising a closure grip part drive for driving said first and second closure grip parts into engagement with said closure.

Preferably, a first closure grip part drive and a second closure grip part drive are provided. Preferably closure drive control means are provided for controlling said first closure grip part drive and second closure grip part drive, said first closure grip part being vertically located above said second closure grip part, said second closure grip part drive being controlled to exert a greater force on said closure grip mount than said second closure grip part drive.

The second aspect further provides a method of closing an opening using a closure, comprising moving said closure from an open position to a closed position, said closure being mounted on a closure carriage, said closure carriage comprising closure grip parts gripping a closure mount of said closure, and driving said first and second closure grip parts using the closure grip part drive so that said closure grip parts move out of engagement with said closure.

The present invention has been described above by way of example only and modifications can be made within the invention which will be further described with reference to the drawings below.

BRIEF DESCRIPTION OF THE DRAWINGS

FIG. 1 is a side view of a closure apparatus according to the present invention.

FIG. 2 shows a vertical cross section through the closure apparatus of FIG. 1.

FIG. 2A is a detailed view of feature 2A of the apparatus illustrated in FIG. 2.

DETAILED DESCRIPTION

Figure 3:
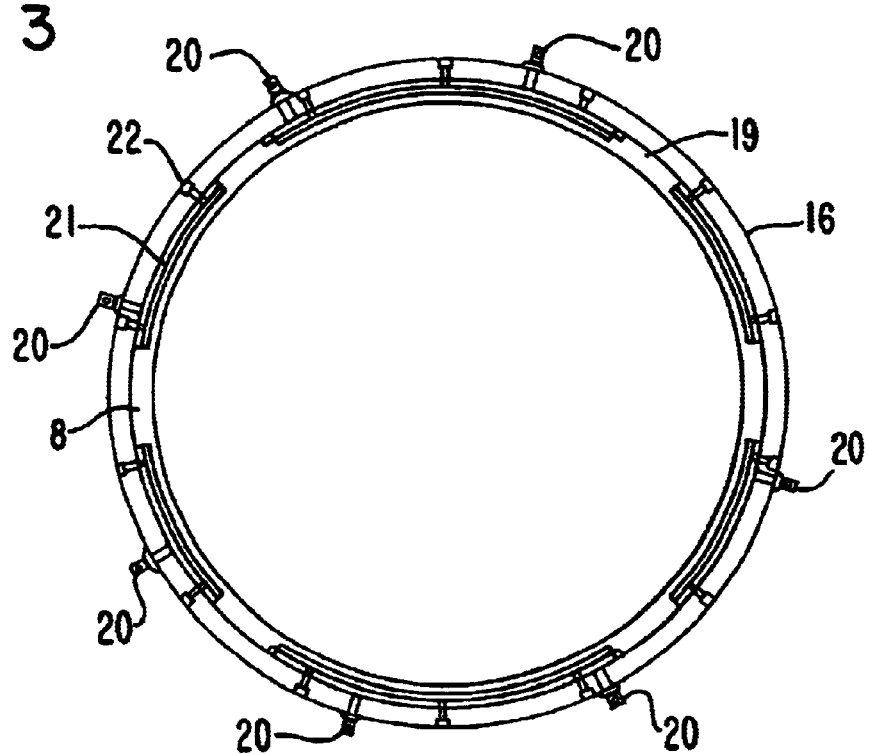
FIG. 3 shows a view of the closure apparatus in the direction of the arrow III of FIG. 1.

A closure apparatus according to the present invention will be described with reference to FIGS. 1, 2 and 2A. The closure apparatus 1 comprises a collar 2 defining an opening 3 which extends from a first, outer end 4 to a second, inner end 5. At the inner end, a flange is provided 6, whereby the closure apparatus 1 may be permanently fixed to a pipe, pressure vessel or other apparatus, part of which is shown in chain dotted lines.

FIG. 2A shows the detail of the bearing surface and locking means of the closure apparatus shown in FIG. 1.

The collar 2 is of circular section and on an outer annular surface comprises a first engagement formation in the form of an annular circumferential structure 7. The structure 7 defines an engagement surface 8 which faces away from the open end 4, and a bearing structure comprising a bearing surface 19. There is also an outwardly facing annular surface 9.

A closure member 10 is provided. It is shown in a closed position. It may also adopt an open position, which will be described further below. The closure 10 comprises an inner, annular edge 11 which, in a closed position, abuts the outwardly facing annular surface 9 of the structure 7. Sealing means, such as an O-ring or other suitable means may be provided between the annular edge 11 and the outwardly facing annular surface 9. A second engagement formation in the form of a plurality of engagement parts 12, which will be described further below, is formed adjacent to the annular face 11.

The closure further comprises a closure mount 13 which will be described further below.

The closure shown in FIGS. 2 and 2A is shown as being formed of three separate components, permanently joined together. These components comprise the supporting edge 14, a bowed section 15 and the closure mount 13. However, where convenient, a closure member may be formed as a single, integral formation.

A locking ring 16 is provided in the form of an annular sleeve which encompasses the annular structure 7 of the collar 2 and the second engagement formation 12 of the closure 10. The bearing surface 19 of the structure 7 defines an outwardly directed bearing surface on which the locking ring 16 is rotatably mounted.

The locking ring 16 comprises a third engagement formation comprising a plurality of engagement parts 17 which have an annular surface which abuts the inwardly directing annular surface 8 of the ring 7. The locking ring further comprises a fourth engagement formation comprising a plurality of engagement parts 18 which will be further described below. These fourth engagement parts engage the second engagement parts of the engagement formation 12 of the closure 10 in the closed position.

The locking ring 16 comprises a plurality of radially adjustable inwardly directed bearing parts 20 whose radially inner ends smoothly abut the bearing surface 19. The bearing parts 20 are adjustable by means of a screw thread in the radial direction, so that the position of the locking ring 16 on the bearing surface 19 can be adjusted accurately to allow smooth operation.

FIG. 3 shows a view in the direction III of FIG. 1. The surface 8 which faces away from the opening 4 can be seen.

It can be seen that the third engagement formation comprises a plurality of engagement parts 21 which are fixed by fixing means comprising screws 22 to the locking ring 16. This construction is adopted to allow assembly of the locking ring onto the first engagement portion. In a first assembly step, a locking ring without the engagement parts 21 is passed over the annular structure 7, the engagement parts 21 being subsequently fixed to the inner surface of the locking ring 16 with the screws 22, so that the third engagement parts are defined, in contact with the surface 8.

Further, the bearing parts 20 can be seen engaging the bearing surface 19.

Figure 4:
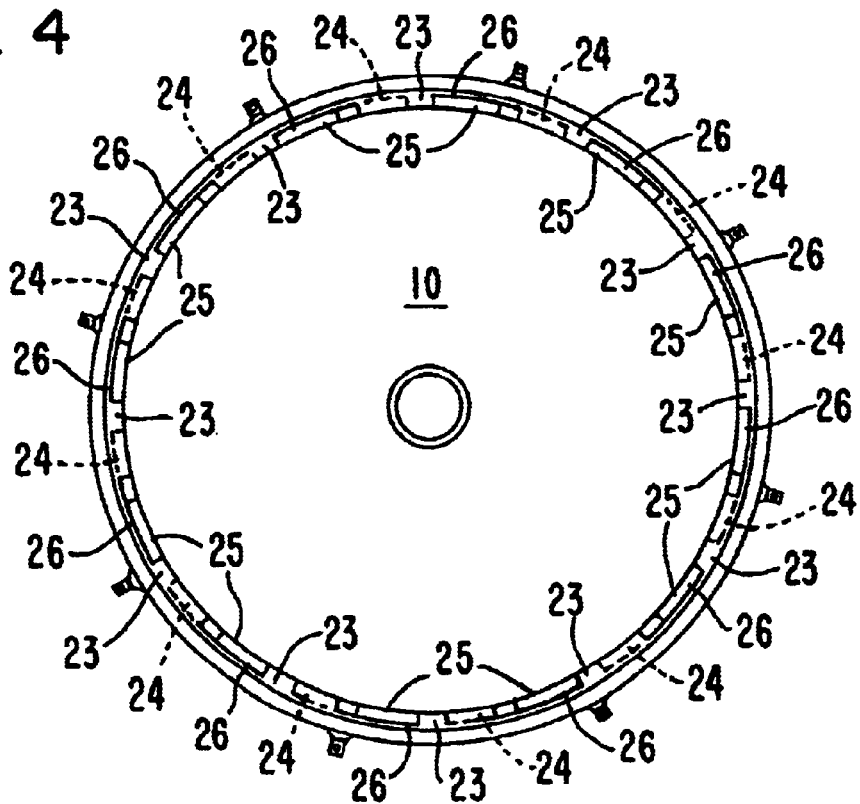
FIG. 4 is an end view of the closure apparatus of FIG. 1.

FIG. 4 is a sketch view of the closure assembly of FIG. 1, from the outer and, in the closed position. The locking ring 16 can be seen. The fourth engagement formation of the locking ring 16 comprises a plurality of radially inwardly projecting locking engagement parts 23. The second engagement formation of the closure 10 can also be seen, comprising a plurality of radially outwardly directed engagement parts 24, which are partly shown in dotted lines, being located behind the engagement parts 23 of the locking means 16. Between the engagement parts 23 of the locking ring 16, clear portions 25 comprising portions of greater radial extent than the engagement parts 23 are formed. Similarly, clear portions 26 are provided between the engagement parts 24 of the closure, comprising portions of lower radial extent than the engagement parts 24. The linear extent of the clear portions 25 is greater than the linear extent of the engagement parts 24 and the linear extent of the clear portions 26 is greater than the linear extent of the corresponding engagement parts 23 so that, when the locking ring is rotated out of the locked position shown in FIG. 5 into an unlocked position, the clear portion 26 align with the engagement parts 23 and the clear portions 25 align with the engagement parts 24. As the engagement parts are smaller than the corresponding clear portion, when they are aligned, the engagement parts are able to pass through the clear portions, allowing the closure to pass into its open position.

Figure 5:
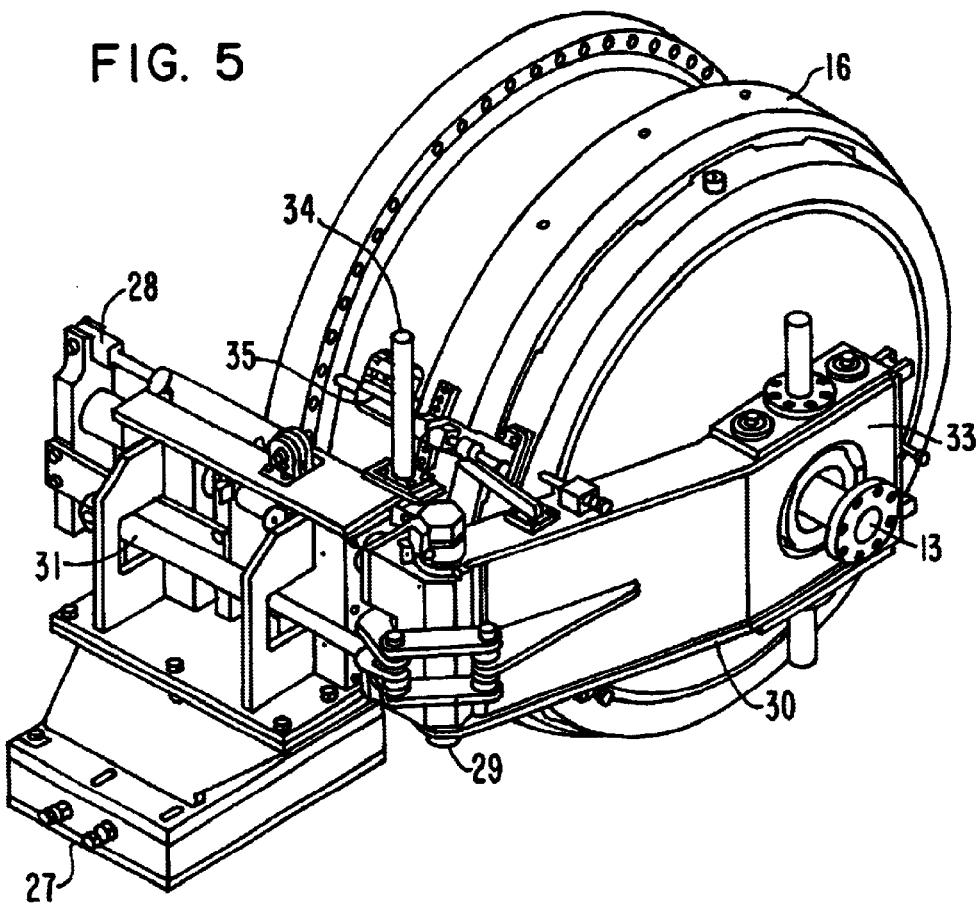
FIG. 5 is an isometric view of a closure apparatus, including the closure carriage, according to the invention.

FIG. 5 shows the closure assembly of FIG. 1 further comprising a closure carriage 27. The closure carriage 27 comprises a closure drive 28 for moving the closure between the closed position and the open position, the open position being displaced away from the closed position in the axial direction of the opening. The closure carriage 27 further comprises a closure hinge 29. A closure arm 30 is rotatably mounted to the carriage 27 at the hinge 29. A rotation drive 31 is provided for acting via a crank mechanism 32 on the closure arm 30 to rotate it into a third position, as will be described further below. The closure arm 30 further comprises a closure mount grip 33, which will be described further below, engaged with the closure mount 13. Also visible in FIG. 5 is a locking drive 34 which will be described further below with respect to FIGS. 6 and 7 and a safety lock 35 which will be described further below with respect to FIGS. 8–11.

Figure 6:
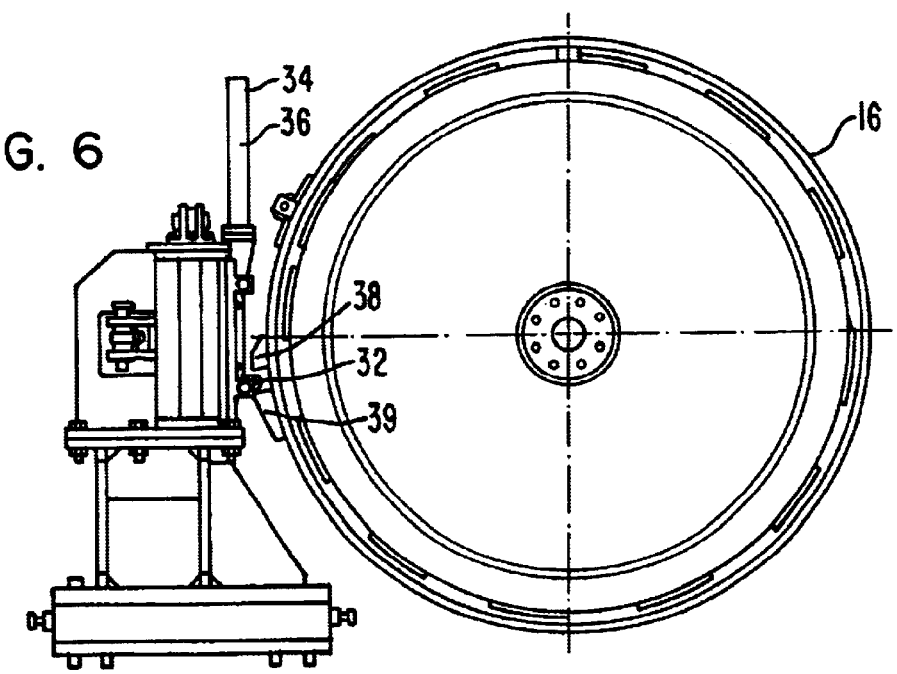
FIG. 6 shows an end view of the closure apparatus of FIG. 1, further comprising a locking drive, in the locked position.
Figure 7:
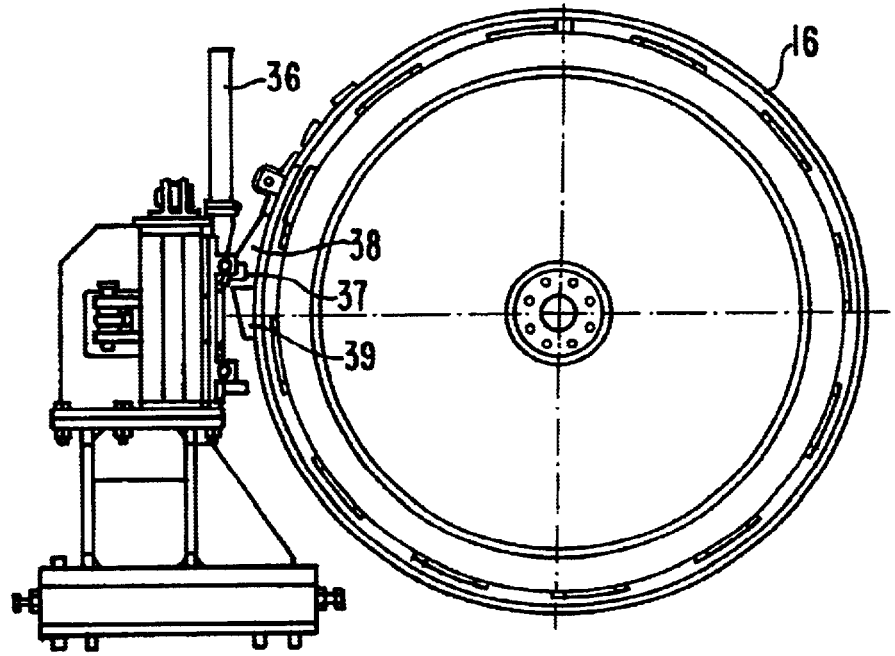
FIG. 7 shows an end view of the closure apparatus of FIG. 6, in the unlocked position.

The locking drive 34 is shown further in FIGS. 6 and 7. It comprises a locking drive piston 36 which reciprocally drives a piston rod with a locking rotation roller 37 at its end. The locking ring 16 comprises a first drive formation 38 and a second drive formation 39.

The locking ring is shown in FIG. 6 in the locked position. The piston rod is shown in the extended position. In order to unlock the locking ring 16, it is necessary to drive the locking ring 16 in a clockwise direction (as seen looking into FIG. 6). The locking drive 34 achieves this by driving the piston rod and the locking roller 37 upwardly using the drive piston 36. The locking roller 37 acts on the drive part 38 of the locking ring 16 in such a manner as to drive it in a clockwise direction for a predetermined distance. In order to move from the unlocked position of FIG. 7 to the locked position of FIG. 6, the drive 34 can be used to drive the locking roller 37 downwards so that it drives the drive part 39 of the locking ring 16, in the anti clock wise direction.

The sequence of operations in closing the opening according to the method of the invention will be described below with reference to FIGS. 8–11.

In FIGS. 8–11, the closure moves from a distant position in which it is swung away from the opening, to an open position in which it is substantially coaxial with the opening but does not close it. Then the closure moves from the open position to the closed position in which it is closed onto the opening but not locked with respect to it. Finally, the closure is locked with respect to the opening.

Figure 8:
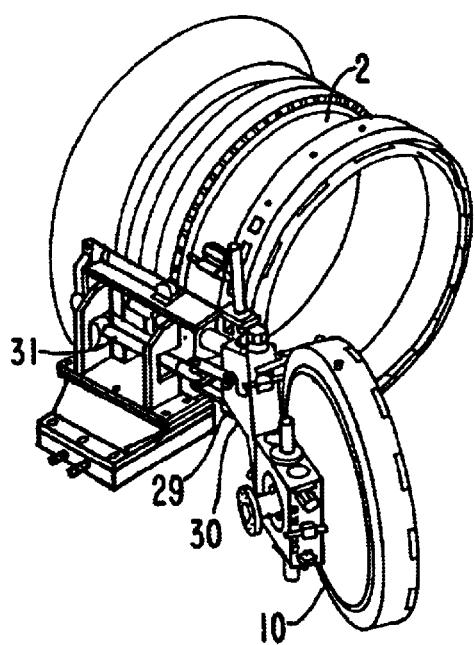
FIG. 8 shows a first step in the method of the present invention
Figure 9:
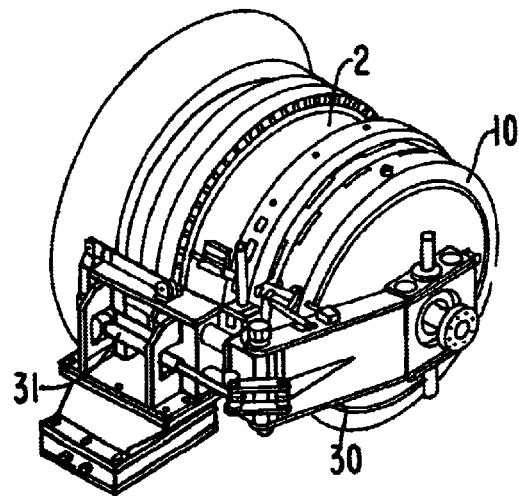
FIG. 9 shows a second step in the method of the invention, in which the closure has been brought into the second position.

FIG. 8 shows the closure 10 in a distant position in which it is swung away from the opening 2, to allow clear access to the vessel of which the opening 2 forms a part. It can be seen that the closure 10 has been swung out on the arm 30 which is pivoted at the hinge 29. (FIG. 9) In a first step, (FIG. 9) the rotation drive 31 is used to drive the arm 30 in a anti-clock wise direction (when seen from above) so that the closure 10 is moved into an open position in which it is located in front of the opening 2 but not yet closing it.

Figure 10:
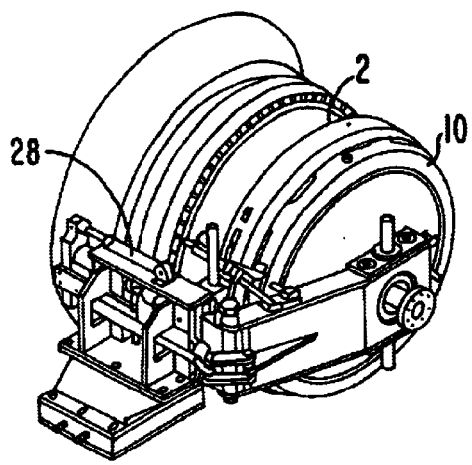
FIG. 10 shows a third step in the present invention in which the closure has been brought into the closed position.

In a second step, shown in FIG. 10, the closure drive 28 is used to draw the closure 10 on the closure carriage 27 towards the opening 2 so that the closure 10 is moved into the closed position, where it closes opening 2 but is not yet locked to it. In the third step showed in FIG. 11, the piston drive 34 is used to rotate the locking ring 16 to lock the closure 10 to the opening 2 as has been described above in relation to FIGS. 6 and 7.

In order to unlock the door, the above-mentioned series of steps are simply reversed.

Figure 12:
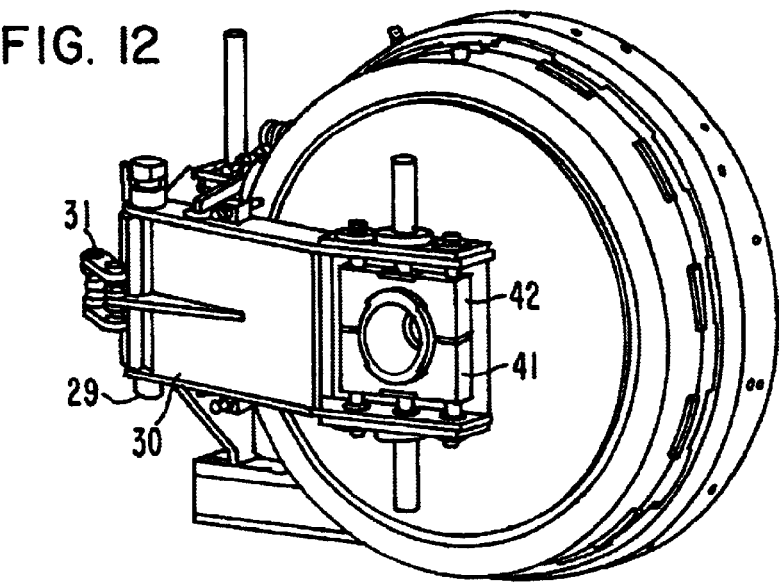
FIG. 12 is a sketch isometric view of the closure in position showing the closure grip.
Figure 13:
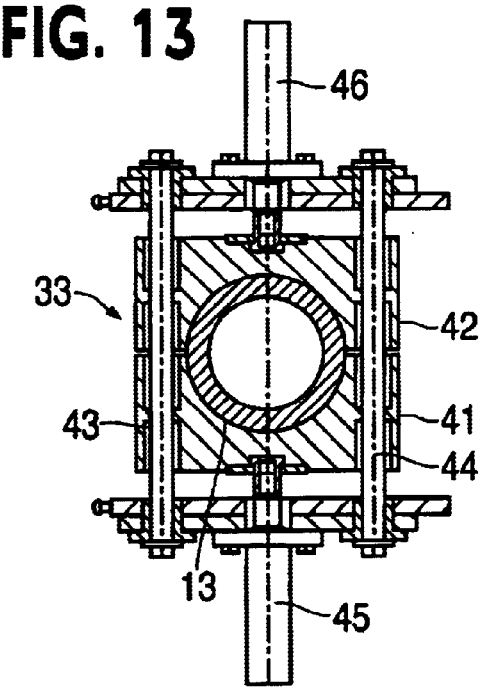
FIG. 13 is a cross sectional view, at enlarged scale, of the closure grip of FIG. 12.

Once the closure has been locked to the opening 2, the arm 30 can be withdrawn from engagement with the closure 10 as will be described further below with respect to FIG. 5, FIG. 12 and FIG. 13. In FIG. 5, it can be seen that the closure mount 13 is held in a closure mount grip 33. FIGS. 12 and 13 show more detail of the closure mount grip 33. It can be seen that it comprises a pair of closure grip parts 41 and 42.

As can be seen in FIG. 13, the closure grip parts 41 and 42 are each slidably mounted on slide rails 43 and 44. Closure grip part drives 45 and 46 are provided for driving the closure grip parts 41 and 42 respectively. A closure grip drive control is provided (not shown in FIGS. 12 and 13). In FIG. 5, and FIGS. 8–11, the closure grip parts are shown in a position in which they are pressed together thereby gripping the closure mount 13.

The lower closure grip part drive 45 and the upper closure grip part drive are controlled so that the lower closure grip part drive 45 exerts a greater load on the closure mount 13 than the closure grip part drive 46. In this way, the weight of the closure 10 is correctly carried by the closure arm 30. Once the closure 10 is in position and locked to the opening 2, the closure grip part drives 45 and 46 can be operated to move the closure grip parts 41 and 42 away from each other so that they do not grip the closure mount 13. In this way, the closure mount is released. Of course, the closure mount will already be in position on the opening 2 and is accordingly secure.

The rotation drive 31 can then be used to rotate the arm 30 on the hinge 29 so that the entire gripping arrangement is moved away from the closure mount 13. FIG. 12 shows the arm 30 beginning to move away from the closure mount 13. The arm can be rotated to the position where it is safely out of the way of the opening and closure 10.

This arrangement is useful, for example where the closure 10 is used to close an opening 2 in a vessel which is operated at high temperature which could damage the closure grip parts. Alternatively, it may be used where the closure 10 is used to close an opening 2 in a vessel which is in motion during a treatment phase.

Figure 14:
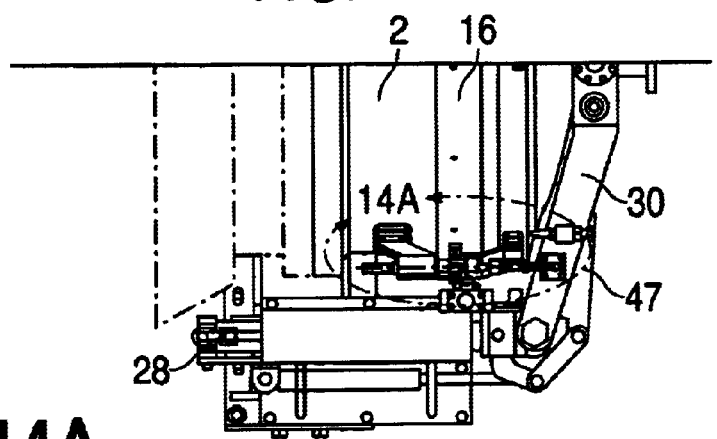
FIG. 14 is a sketch view of the safety locking mechanism, in the unlocked position.
Figure 14A:
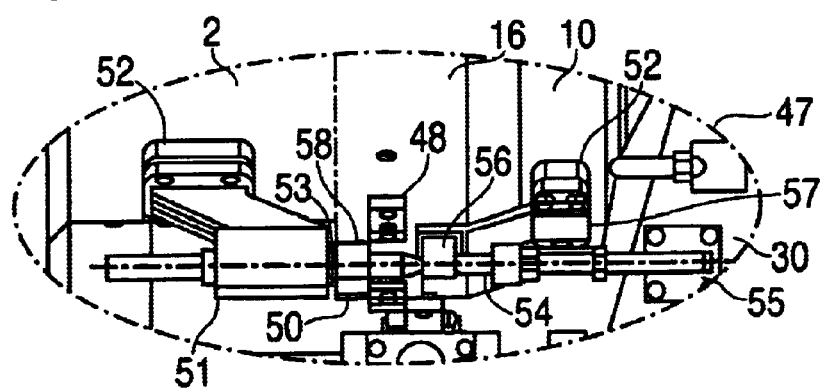
FIG. 14A is a detailed view of the feature identified by reference numeral 47 of the apparatus illustrated in FIG. 14.
Figure 15:
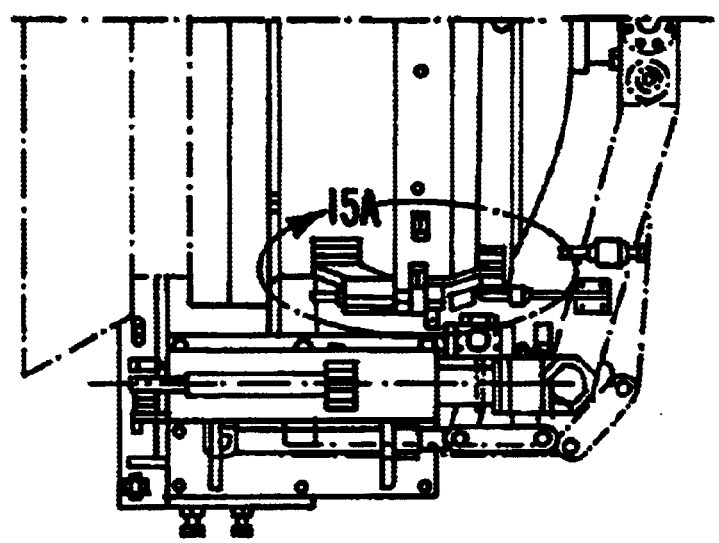
FIG. 15 is a sketch isometric view of the safety locking mechanism in the locked position.
Figure 15A:
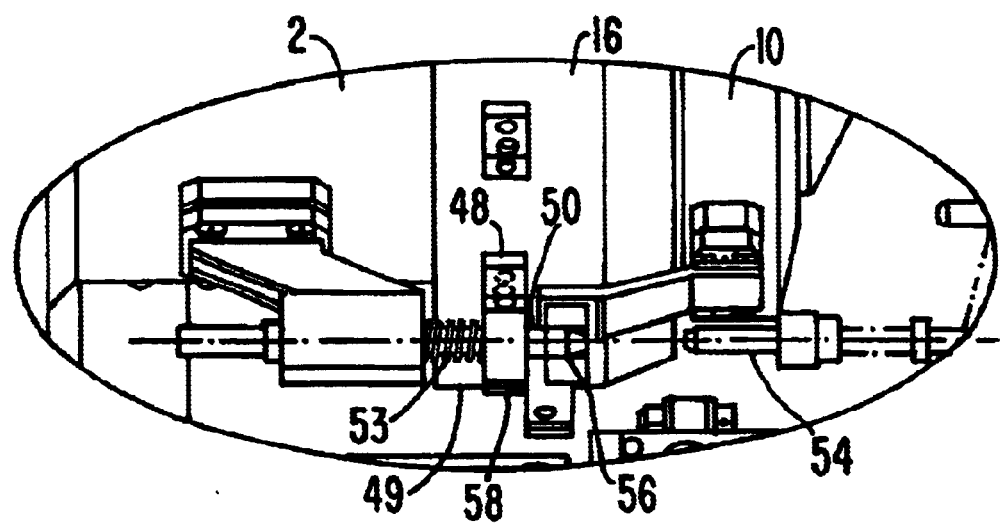
FIG. 15A is a detailed view of the feature of feature 15A of the apparatus illustrated in FIG. 15.

FIGS. 14 and 14A are a sketch plan view of a safety locking mechanism in position on the closure and opening of FIGS. 8–11, with an enlarged section to show the detail of the safety locking mechanism. FIGS. 14 and 14A show the safety locking mechanism in the unlocked position whereas FIG. 15 shows the safety locking mechanism in the locked position.

The safety locking mechanism can be seen in FIGS. 14 and 14A adjacent to locking ring 16 on the opening 2. It is located next to the first drive cylinder 28 and the arm 30 (as shown in FIG. 5). As shown in greater detail in the enlarged section of FIG. 14A, the safety locking mechanism comprises a latching formation 47 comprising two latching part 48 and 49 on the locking ring 16. A latching member 50 is mounted on the closure 2. The latching member 50 is slidably mounted in a latching member mount 51 which is securely mounted on the opening 2 by the bracket 52. A coil spring 53 is provided for biasing the latching member 51 towards the right hand side of the figure. However, it is prevented from moving towards the right hand side of the figure by an unlatching member 54. The unlatching member 54 is mounted on the arm 30 by a bracket 55 and extends through a latching part 56 which is formed on a bracket 57 on the closure.

The latching member 50 further comprises a latching block 58 whose function will be described below.

Figure 11:
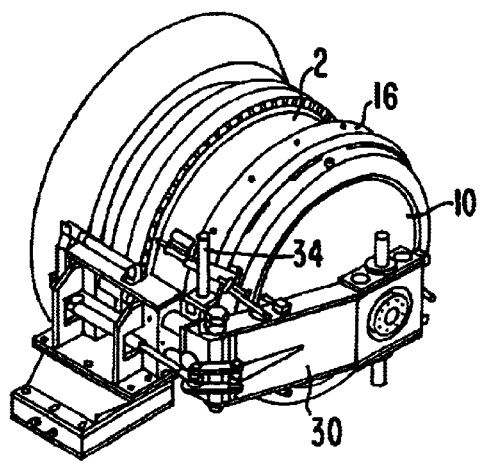
FIG. 11 shows a final step in the method of the present invention, in which the locking ring has been rotated into the locked position.

In any position, for example as shown in FIG. 11, in which the arm 30 with the closure 10 mounted on it has been drawn close to the opening 2, the unlatching member 54 projects from the arm 30, through the latching formation 56 and engages the front of the latching member 50, pushing the latching block 58 out of engagement with the latching parts 48 and 49 on the locking ring 16. In the arrangement shown in FIG. 14, the safety locking mechanism cannot prevent the rotation of the locking ring 16. The locking ring 16 can accordingly be moved between a locked and unlocked position. The locking ring shown in the locked position in FIG. 14. As described above in relation to FIGS. 8–11, the arm 30 can be drawn away from the opening 2 and closure 10 during operation of the vessel of which the opening forms a part. When this happens, the unlatching member 54 is drawn away from the closure 2, being moved towards the right hand side of the figure. This allows the latching member 50 to move towards the right hand side of the figure under the influence of the coil spring 53. Accordingly, it adopts the position shown in FIG. 15 in which the latching part 58 is securely located between the latching formations 48 and 49. Further, the tip of the latching member 50 is engaged inside the latching formation 56 which is part of the closure 10. In this way, relative rotation of the locking ring 16 with respect to the closure 10 and the opening 2 is prevented by the mural interengagement of the latching formations 48,49 the latching member 50 and the latching formation 56.

The collar comprising the opening, the locking ring and the supporting edge of the closure may be formed of forged steel, according to the US specification ASTMA105. The bowed section 15 and the closure mount 13 of the closure may be formed of plate steel according to specification ASTM516, Grade 70.

The present invention has been described above by way of example only and modifications can be made within the invention.

What is claimed is:

1. Closure apparatus, comprising:
   a collar having a collar periphery and having a collar inner surface defining an opening,
   a closure, having a closure periphery, said closure being for closing said opening,
   a bearing structure being located around said collar periphery or said closure periphery, a locking ring being mounted for rotation with respect to said closure and said opening on said bearing structure, so that said locking ring is rotatable between a locking position for locking said closure to said opening and an unlocked position for permitting said closure to be moved away from said opening,
   wherein said closure is mounted an a closure carriage, said closure carriage comprising a closure grip for releasably engaging said closure, and
   wherein said closure grip comprises at least two closure grip parts and said closure comprises at least one closure grip mount, a closure grip part drive being provided for driving the first and second closure grip parts to engage said closure grip mount.

2. The closure apparatus of claim 1, wherein said collar has a collar inner surface defining an opening and a collar outer surface, and at least one first engagement formation formed on said collar outer surface, said closure has a closure outer surface, at least one second engagement formation being formed on said closure outer surface, said locking ring has a locking ring inner surface and at least one third and at least one fourth engagement formation formed on said locking ring inner surface, said locking ring being rotatably mounted with respect to said collar and said closure, between a locked position and an unlocked position, said closure closing said opening in a closed position and being spaced away from said opening in an open position, said locking ring being configured so that said third engagement formation engages one of said first and second engagement formations, and so that, in said locked position, said fourth engagement formation is engaged with the other of said first and second engagement portions, to hold said closure in said closed position, and in said unlocked position, said fourth engagement formation is spaced apart from said other of said first and second engagement portions to permit said closure to be moved into said open position.

3. A closure apparatus according to claim 2, wherein at least one of said third engagement formation and said one of said first and second engagement formations engaged by said third engagement formation comprises a substantially continuous annular surface against which the other of said third engagement formation or said one of said first or second engagement formations is slidably mounted.

4. A closure apparatus according to claim 1, wherein said locking ring is rotatably mounted on said collar and said fourth engagement formation is engageable with said second engagement formation of said closure in said locked position, said fourth engagement formation being spaced apart from said second engagement formation in said unlocked angular position to permit said closure to be moved into said open position.

5. A closure apparatus according to claim 2, wherein said fourth engagement formation comprises at least four engagement parts projecting from said locking ring inner surface, said engagement parts being spaced apart from one another by clear sections, said other of said first and second engagement formations comprising the same number of engagement parts as are formed on said locking ring, spaced apart by clear sections, said engagement parts and clear sections being configured so that, in said unlocked position, said engagement parts can pass through said clear sections.

6. A closure apparatus according to claim 1, further comprising a drive for driving said locking ring to rotate between said locked position and said unlocked position.

7. A closure apparatus according to claim 6, wherein said locking ring comprises at least one drive formation and said drive comprises at least one drive part engageable with said drive formation, said drive part being reciprocable between a first drive position corresponding to said locked position and a second drive position corresponding to said unlocked position.

8. Closure apparatus according to claim 1, wherein said bearing structure is mounted on one of said collar and said closure, at least one of said locking ring and said one of said collar or said closure comprising a substantially continuous annular bearing surface, and the other of said locking ring and said one of said closure or collar comprising bearing pieces slidably contacting said annular surface.

9. Closure apparatus according to claim 8, wherein said bearing pieces each comprise an adjustment to allow them to be adjusted in a radial direction towards or away from said annular bearing surface.

10. Closure apparatus according to claim 1, further comprising safety locking means having a latched position and an unlatched position, the safety locking means preventing said locking ring from rotating from said locked position to said unlocked position in said latched position and permitting said locking ring to be rotated from said locked position to said unlocked position in said unlatched position.

11. Closure apparatus according to claim 10, wherein said safety locking means comprises at least one first latching formation on at least one of said closure and said collar and at least one second latching formation on said locking ring and at least one latching member for engaging said first latching formation and said second latching formation in said latching position to prevent relative movement thereof.

12. Closure apparatus according to claim 1, wherein said collar has an axial direction, said closure being movable between a closed position and an open position along said axial direction, a closure drive being provided for driving said closure along said axis between said closed and open positions.

13. Closure apparatus according to claim 12, wherein said closure is mounted on a closure carriage comprising a closure slide for moving said closure in said axial direction and a closure hinge to allow said closure to move from said open position to a distant position angularly displaced from said open position.

wherein said closure is mounted on a closure carriage, said closure carriage comprising a closure grip for releasably engaging said closure, and wherein said closure grip comprises at least two closure grip parts and said closure comprises at least one closure grip mount, a closure grip part drive being provided for driving the first and second closure grip parts to engage said closure grip mount.

14. Closure apparatus according to claim 1, wherein said closure has a weight in excess of 20 kg.

15. A method of closing an opening formed in a collar, comprising: moving a closure from an open position to a closed position, said closure closing said opening in said closed position, and said closure comprising:

a collar having a collar periphery and having a collar inner surface defining an opening, a closure periphery, said closure being for closing said opening, a bearing structure being located around said collar periphery or said closure periphery, a locking ring being mounted for rotation with respect to said closure and said opening on said bearing structure, so that said locking ring is rotatable between a locking position for locking said closure to said opening and an unlocked position for permitting said closure to be moved away from said opening; and rotating the locking ring from an unlocked position to a locked position, wherein said collar has a collar outer surface and at least one engagement formation formed on said collar outer surface, said closure having a closure outer surface with at least one second engagement formation formed on said closure outer surface, said locking ring having a locking ring inner surface and at least one third engagement formation and at least one fourth engagement formation formed on said locking ring inner surface, said locking ring being configured so that said third engagement formation engages one of said first and second engagement formations in said locked position to hold said closure in said closed position and so that in said unlocked position, said fourth engagement formation is spaced apart from said other of said first and second engagement portions, to permit said closure to be moved into said open position, wherein said closure is mounted on a closure carriage, said closure carriage comprising a closure grip for releasably engaging said closure, and wherein said closure grip comprises at least two closure grip parts and said closure comprises at least one closure grip mount, a closure grip part drive being provided for driving the first and second closure grip parts to engage said closure grip mount.

* * * * *

UNITED STATES PATENT AND TRADEMARK OFFICE
CERTIFICATE OF CORRECTION

PATENT NO. : 6,886,709 B2
DATED : May 3, 2005
INVENTOR(S) : Brian Smith

It is certified that error appears in the above-identified patent and that said Letters Patent is hereby corrected as shown below:

Column 13,
Please delete lines 4 through 11.

Signed and Sealed this

Nineteenth Day of July, 2005

JON W. DUDAS
*Director of the United States Patent and Trademark Office*